A. C. MICHEL.
SHOE OR TREAD FOR TRACTION ENGINES.
APPLICATION FILED APR. 4, 1918.
1,289,509.
Patented Dec. 31, 1918.
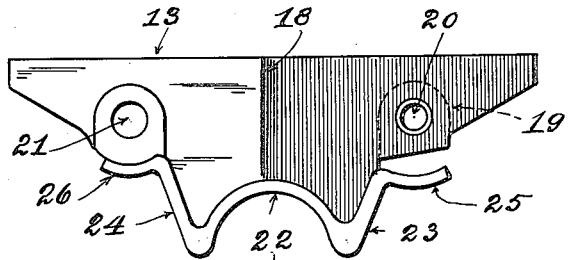
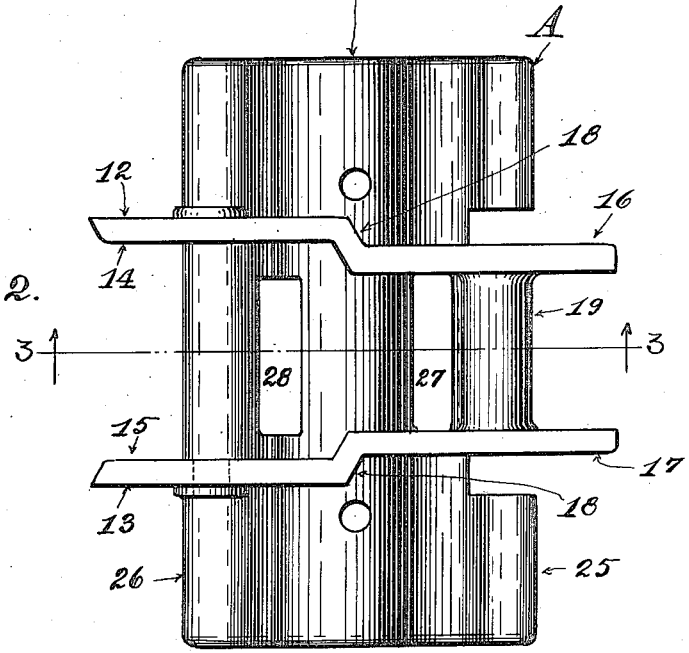
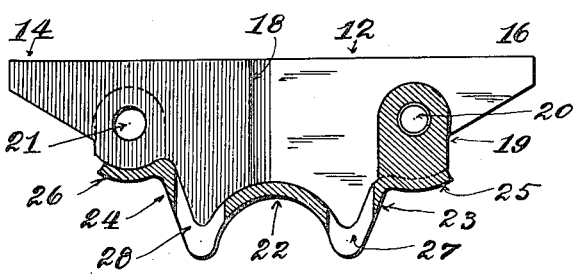
WITNESSES:
J. E. Stark
Al. Stark.
INVENTOR:
ADOLPH C. MICHEL,
BY Michael J. Stark & Sons,
ATTORNEYS.

UNITED STATES PATENT OFFICE.

ADOLPH C. MICHEL, OF SENEY, MICHIGAN, ASSIGNOR TO BULLOCK TRACTOR CO., OF CHICAGO, ILLINOIS, A CORPORATION OF ILLINOIS.

SHOE OR TREAD FOR TRACTION-ENGINES.

1,289,509.

Specification of Letters Patent.  Patented Dec. 31, 1918.

Application filed April 4, 1918.  Serial No. 226,652.

*To all whom it may concern:*

Be it known that I, ADOLPH C. MICHEL, a citizen of the United States, and a resident of the village of Seney, in the county of Schoolcraft and State of Michigan, have invented a certain new and useful Improvement in Shoes or Treads for Traction-Engines; and I do hereby declare that the following description of my said invention, taken in connection with the accompanying sheet of drawing, forms a full, clear, and exact specification, which will enable others skilled in the art to which it appertains to make and use the same.

My invention relates generally to improvements in traction engines, and it consists, essentially, in the novel and peculiar combination of parts and details of construction, as hereinafter first fully set forth and described and then pointed out in the claims.

The object of this invention is the production of an efficient, serviceable, and durable shoe or tread for endless track bands of motor vehicles, traction engines, and the like. In this type of motor vehicles there is a very serious drawback, for the reason that sand, grit, clay, and other foreign matter is liable to lodge upon the upper surface of the lower or ground run of the track band, which is carried to the driving mechanism and the sprocket wheels of the tractor and thereby seriously interfere with the proper functioning of the machine. To overcome this objection, I construct the shoe or tread of a traction engine as shown in the drawings forming a part of this specification, in which Figure 1 is a side elevation of the improved shoe or tread. Fig. 2 is a plan of the same; and Fig. 3 is a sectional elevation on line 3—3 of Fig. 2.

This shoe or tread comprises a plate A, of proper length, width, and thickness, made of cast metal, cast steel being preferred. Upon this plate there are located two rails 12, 13, which constitute the track upon which the motor vehicle moves, said tracks being, in fact, links by which a series of shoes are connected to form the endless track band, each link being of the hermaphrodite type, the ends 14, 15, of the track being the male portion of the link while the ends 16, 17, form the female part of the link, this condition being attained by offsetting the rails 12, 13, medially of their length, as shown at 18, whereby the ends 16, 17, fit between, and engage the ends 14, 15.

The ends 16, 17, are connected by a boss 19, having a bolt-opening 20, while the ends 14, 15 are punctured, as at 21, for the reception of bolts, not shown, by which adjacent links are connected to form an endless belt.

The plate A is of peculiar formation, comprising an arch-shaped medial section 22, and two, outwardly inclined walls 23, 24, which latter portions terminate in outwardly extending, curved, portions 25, 26, so that the cross section of the plate A at any point resembles the capital letter W. In this plate there are two oblong openings 27, 28, which pass through the shoe at the junction of the arch 22 and the inclined walls 23, 24, or, as it were, at the lowest point of the shoe. These openings 27, 28, perform the function of outlets from the space between the tracks 12, 13, so that should sand, grit, clay or other foreign matter lodge upon the plate between the rails, such matter will roll down the curved, downwardly extending, portions of the arch 22 and the inner surfaces of the inclined walls 23, 24, and pass through these openings, while when the endless track band passes over the usual sprocket wheels, the teeth thereof entering the space between the rails, will force any stiff and adhering matter through these openings in an efficient manner. It will thus be noted that the arch 22 in conjunction with the inclined walls 23, 24, perform the important function of conducting the foreign matter between the rails to the outlet or discharge openings 27, 28, so that nearly all of such foreign matter will be discharged from the upper surface of the shoe by its own gravity.

I may here state that the entire shoe or tread is completely formed in the process of casting, thereby forming a homogeneous and integral whole which is not liable to get out of order, but will retain its usefulness for a long time, notwithstanding the fact that the shoes of an endless track for motor vehicles are subjected to severe strain and very rough usage.

Having thus fully described this invention I claim as new—

1. A shoe or tread for endless track bands, comprising a plate, said plate having an approximately W-shaped transverse section, tracks upon said plate, there being between said tracks oblong openings through said plate at the apexes of the diverging members thereof.

2. A shoe or tread for endless track bands, comprising a plate, a pair of tracks upon said plate, said plate having medially a transverse arch and adjacent said arch outwardly extending, inclined walls, there being in said plate at the jointure of said arch and said inclined walls between said tracks through-openings, as described for the object stated.

3. A shoe or tread for endless track bands, comprising a plate, a pair of tracks upon said plate, said plate having medially a transverse arch and adjacent said arch outwardly extending, inclined walls, there being in said plate between said tracks at the jointure of said arch and said inclined walls, oblong openings passing through said plate at its lowest points, the whole being integrally formed in the process of casting.

In testimony that I claim the foregoing as my invention, I have hereunto set my hand.

ADOLPH C. MICHEL.